Figure 3:
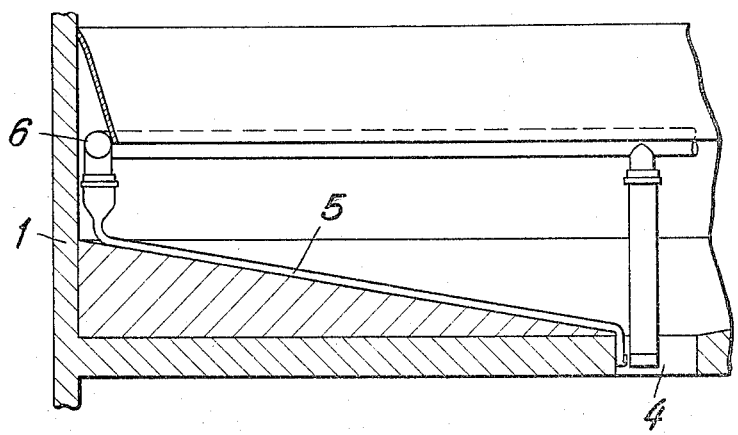

Dec. 13, 1966 W. HERMANNS 3,291,457
HOMOGENIZING SILO FOR POWDERY OR FLOURY BULK MATERIAL
Filed July 31, 1964 2 Sheets-Sheet 1
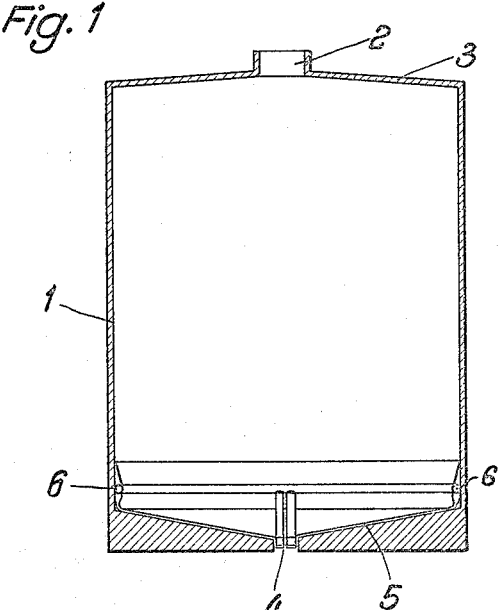
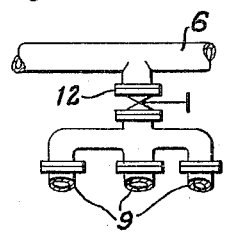
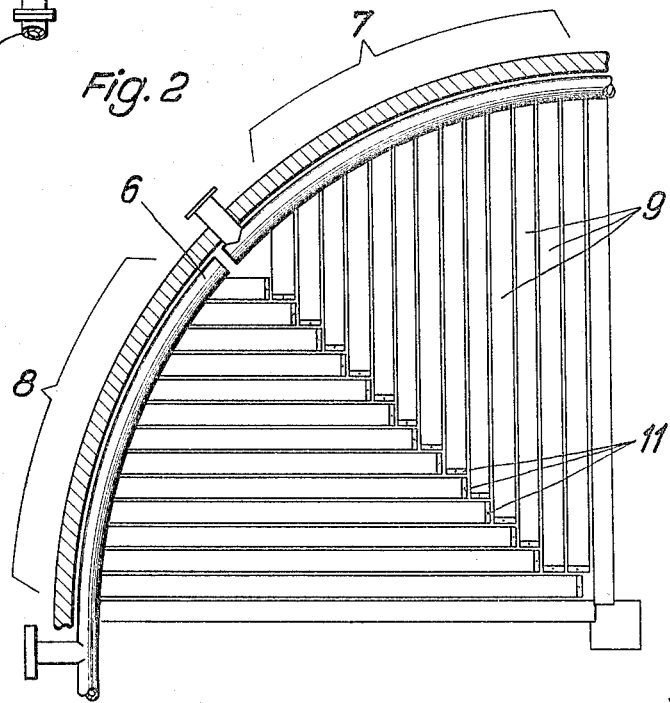
Inventor:
Wilhelm Hermanns
BY
ATTORNEYS

United States Patent Office 3,291,457
Patented Dec. 13, 1966

3,291,457
HOMOGENIZING SILO FOR POWDERY OR
FLOURY BULK MATERIAL
Wilhelm Hermanns, 6–14 Frankfurter Strasse,
Porz-Urbach, Germany
Filed July 31, 1964, Ser. No. 386,696
Claims priority, application Germany, Aug. 2, 1963,
H 49,891
5 Claims. (Cl. 259—18)

This invention relates to a homogenizing silo for powdery or floury bulk material such as a silo used for homogenizing and mixing of the raw powder of cement, homogenizing of the bulk material being effected pneumatically.

Silos known prior to this invention for homogenizing and mixing of powdery or floury material utilize a finely porous layer of ceramic air pervious plates or of air pervious sintered metal plates or of fabric webs spaced above the silo bottom, compressed air being introduced underneath said layer which penetrates into the material to be homogenized and mixed, respectively, through the pores of the plates and permits a good homogenizing and mixing of the bulk material lying upward especially in case of a correlation of the plates forming the venting bottom into groups and supplying compressed air of different pressure to the said groups of plates.

Such homogenizing silos, however, are relatively expensive, since the plates forming the venting bottom not only have to be installed providing a hollow space underneath, but must also be fixedly grouted, and since a plurality of pipe lines has to be installed underneath the venting bottom leading to the respective plates or group of plates. A further disadvantage of the homogenizing silos presently known is that the pores of the rigid ceramic or sintered metal plates easily tend to clog, and in case of a fracture of a plate, respectively, which is likely to especially occur when using ceramic plates, the entire compressed air supplied to the assembly of plates containing the fractured one will evade through the fracture. Shutting down the compressed air supply will result in the powdery material coming behind the plates through the fracture and thus entering the piping system, so that when the compressed air supply is started again powdery material will also be blown into the remainder of the plates of the homogenizing system from behind and thus possibly making these plates likewise ineffective. Furthermore, replacement of plates which have become unusable by new plates is difficult and costly.

An object of this invention is therefore to eliminate the disadvantages described. For this purpose, the main feature of the present invention is that the finely porous layer covering the silo bottom consists of hoses arranged directly adjacent one another, directly lying on the silo bottom, kept flat by means of inserts, closed at their one end, and having air pervious walls, said hoses being connected to one or more compressed air lines extending along the periphery of the silo bottom, with their other ends, and preferably being suppliable with compressed air in groups.

In this embodiment, the hoses in accordance with the present invention may cover the silo bottom lying closely adjacent one another chord-like, or, an embodiment of particular advantage, they may be arranged within each quadrant of the silo bottom in two sector-like groups extending in two directions rectangular to one another such that each hose of the one group has its face of the closed-off end lying against the side wall of the free end of a hose of the other group.

The invention is also provided for a connection of the hoses in respective groups to compressed air headers extending along the periphery of the silo bottom and having different pressure ratings or to a compressed air ring conduit extending along the periphery of the silo bottom, throttle valves or the like being provided between said conduit and the groups of hoses.

Figure 4:
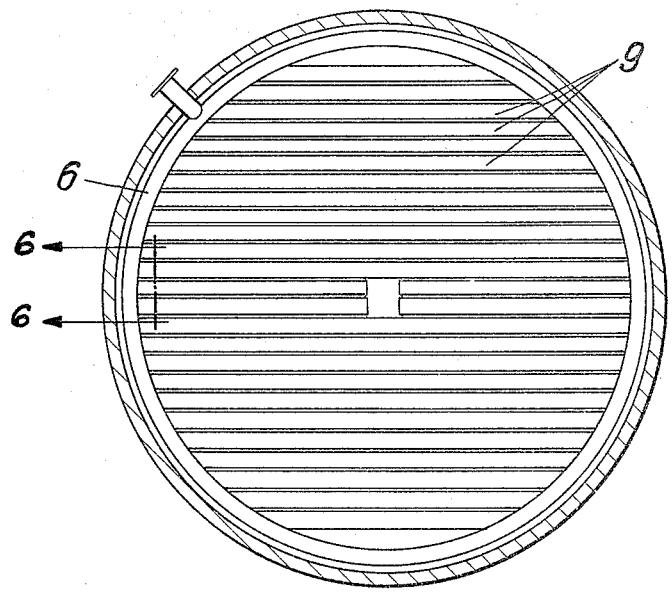
Figure 5:
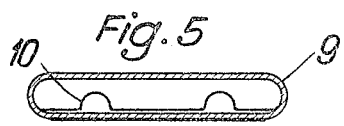

In the drawings, a homogenizing silo in accordance with the invention has been illustrated in two structural instances schematically, FIG. 1 showing a longitudinal sectional view of a homogenizing silo according to the invention;

FIG. 2 showing a plan view of a quadrant of the silo of FIG. 1 in a larger scale;

FIG. 3 showing a section through the quadrant of the silo of FIG. 2;

FIG. 4 being a schematic plan view of a silo bottom with hoses arranged chord-like on said bottom; and FIG. 5 being a section through one of the hoses lying on the silo bottom;

FIGURE 6 being an elevational view taken along the line 6—6 of FIGURE 4, and illustrating several hoses combined into a group, with a throttle valve being provided between the ring conduit and the group of hoses.

The homogenizing silo of FIG. 1 comprises a cylindrical portion 1, a cover 3 having an opening 2, and a slightly inclined bottom 4 inclined in direction toward a discharge opening 4 which may be alternatively opened and closed. A ring conduit 6 is provided extending near the periphery of the silo bottom and connected to a compressed air source not illustrated, to which ring conduit 6 air pervious hoses 9 are connected within each quadrant of the silo bottom in two sectors 7 and 8, as illustrated in FIGS. 2 and 3, said hoses directly lying on the silo bottom, kept flat by means of inserts introduced into them (FIG. 5), and lying closely next to one another. The hoses are preferably rubberized at their bottom portions, that is made air-tight. In case the weight of the inserts 10 introduced into the hoses is not sufficient to secure the mutual close proximity of the hoses, said hoses may be clamped to the bottom of the silo by means of clamping devices. For this, clamping means are preferably used pressing onto the inserts extending through hoses 9 spaced along the hoses and effecting the pressure via the hose wall, said clamping means held by pins supported on the silo bottom. The hoses of each of the two sectors 7 and 8 within a quadrant of the silo bottom are provided in different lengths, as illustrated in FIG. 2, and are arranged in such a manner that their closed ends 11 lie against the side wall of the ends of the hoses in the adjacent hose sector. The respective hose sectors may be consecutively supplied with compressed air of equal pressure in a certain sequence or alternatively simultaneously with compressed air of different pressure.

In case the silo bottom is not slightly inclined in direction toward a central opening, but provided horizontally, the hoses may be arranged extending chord-like across the bottom, as illustrated in FIG. 4, several hoses 9 being combined in groups connected to a compressed air conduit 6 extending along the periphery of the hose bottom, provisions being made to be able to arrange throttle valves 12 between the compressed air line and the hose assemblies as shown in FIGURE 6.

Arranging the hoses on the silo bottom and their connection to the compressed air header may be effected with a minimum of installation cost so that replacement of the hoses is also simply and inexpensively effectable. Moreover, installation of a plurality of hoses covering the silo bottom permits various compressed air distributions in the powdery material and thus an especially good homogenizing and mixing effect of the bulk material.

What I claim is:

1. In a homogenizing silo for powdery or floury bulk material having a finely porous layer covering the silo bottom, compressed air being pressed through said layer into the material in the silo, the finely porous layer covering the silo bottom consisting of hoses arranged directly adjacent one another, directly lying on the silo bottom, kept flat by means of insert means, closed at their one end, and having air pervious walls, said hoses being connected to one or more compressed air supplying conduits extending along the periphery of the silo bottom, with their other ends, and being suppliable with compressed air in groups.

2. In a homogenizing silo according to claim 1, said hoses covering the silo bottom chord-like and lying closely next to one another.

3. In a homogenizing silo according to claim 1, said hoses being arranged, within each quadrant of the silo bottom, in two sector-like groups in two directions extending perpendicularly to one another so that each hose of one group lies against the side wall of the free end of each hose of the other group with the face of its closed end.

4. In a homogenizing silo according to claim 1, said hoses being connected in groups to compressed air conduits having different pressures and extending along the periphery of the silo bottom.

5. In a homogenizing silo according to claim 1, said groups of hoses being connected to a compressed air ring conduit extending along the periphery of the silo bottom, throttle valves being provided between said ring conduit and said groups of hoses.

References Cited by the Examiner
UNITED STATES PATENTS

| | | | |
|---|---|---|---|
| 2,244,195 | 6/1941 | Hasselbach | 259—18 |
| 2,844,361 | 7/1958 | Dilcher et al. | 259—4 X |
| 3,003,752 | 10/1961 | Frost | 259—4 |

WALTER A. SCHEEL, *Primary Examiner.*

J. M. BELL, *Assistant Examiner.*